United States Patent [19]

Blumstein et al.

[11] Patent Number: 5,037,916

[45] Date of Patent: Aug. 6, 1991

[54] SUBSTITUTED EXTENSIVELY CONJUGATED IONIC POLYACETYLENES

[75] Inventors: Alexandre Blumstein, Chelmsford; Sundar Subramanyam, Stoneham, both of Mass.

[73] Assignee: University of Lowell, Lowell, Mass.

[21] Appl. No.: 494,573

[22] Filed: Mar. 16, 1990

[51] Int. Cl.$^5$ ............................................ C80F 138/02
[52] U.S. Cl. .................................. 526/240; 526/285; 526/265; 526/275; 525/327.1; 525/328.1; 525/326.6
[58] Field of Search ............... 526/285, 265, 275, 240; 525/327.1, 328.1, 326.6

[56] References Cited

U.S. PATENT DOCUMENTS

| | | | |
|---|---|---|---|
| 3,658,942 | 4/1972 | Kargin et al. | 525/256 |
| 4,204,216 | 3/1980 | Heeger et al. | 357/8 |
| 4,222,903 | 9/1980 | Heeger et al. | 252/518 |
| 4,269,738 | 5/1981 | Pez | 252/500 |
| 4,395,497 | 7/1983 | Naarmann et al. | 523/135 |

OTHER PUBLICATIONS

A. R. Katrizky et al., pi Helvetica Chimica Acta, 67:939-946 (1984).

V. A. Kabanov et al., *J. Macromol. Sci.-Chem.*, A9 (2):273-283 (1975).

V. A. Kabanov et al., *J. Appl. Polym. Sci.*, 19:1275-1281 (1975).

V. A. Kabanov et al., *Nuova Chimica*, 49(8):63-65 (1973).

Hackh's Chemical Dictionary, 4th Ed., McGraw Hill, New York, (1972), pp. 27, 62.

G. Wegner, "Organic Linear Polymers with Conjugated Double Bonds", in H. J. Keller, ed., Chemistry and Physics of One-Dimensional Metals, Plenum Press, N.Y. (1977).

*Primary Examiner*—Joseph L. Schofer
*Assistant Examiner*—M. Nagumo
*Attorney, Agent, or Firm*—Hamilton, Brook, Smith & Reynolds

[57] ABSTRACT

A family of ionic polyacetylenes containing long sequences of conjugated double bonds in the backbone with ionic charges adjacent to or in conjugation with the backbone, and a synthetic process for preparing them, are disclosed. These polymers, which are soluble in many solvents, including water, are mono- and di-substituted polyacetylenes that are extensively conjugated. The charge density and geometry of charge distribution depends on the number and nature of the substituents.

6 Claims, No Drawings

SUBSTITUTED EXTENSIVELY CONJUGATED IONIC POLYACETYLENES

GOVERNMENT SUPPORT

The work described herein was supported by a grant from the National Science Foundation.

BACKGROUND

Polyacetylene have long been known as electrically conductive materials. They show a range of conductivities, ranging from insulators to quasi metal conductors. They have been used in energy storage devices, for example in construction of lightweight, solid batteries and for energy conversion. However polyacetylenes have several disadvantages which limit their applications. They are unstable in particular to oxygen, and have poor solubility and poor processibility Substituted polyacetylene generally have no conductive properties. These polymers are typically used to manufacture permselective membranes for gas separation. They have improved stability toward oxygen in comparison to unsubstituted polyacetylene, but possess low levels of conjugation and poor processibility. Both unsubstituted and substituted polyacetylenes are difficult to prepare and their polymerization is often accompanied by the formation of undesirable cyclized by-products There is a need for electrically conductive stable polyacetylenes that are oxygen-stable processible and which can be synthesized without the formation of undesired by-products Such materials would find extensive application in energy storage devices, in the manufacture of electrodes, as solid electrolytes, and as permselective membranes

SUMMARY OF THE INVENTION

The present invention relates to a class of novel, highly conjugated acetylene polymers and a process for their preparation. These polymers are substituted, highly conjugated, charged acetylene polymers.

The present method involves providing acetylene monomers in which the acetylenic triple bond is either adjacent to or in conjugation with a quaternized charge-bearing heteroatom. This in turn can be obtained from either a quaternized heteroatom or a heteroatom capable of acting as a quaternizing agent. These acetylene monomers spontaneously polymerize to form highly conjugated, charged polyacetylenes.

In one embodiment of the method, an acetylenic moiety is reacted with a compound having a quaternizable heteroatom, resulting in the formation of an acetylenic monomer in which the triple bond is adjacent to the quaternized charge-bearing atom. In this method, an acetylenic compound having the general formula:

R—C≡C—X wherein R is H alkyl, alkoxy, aryl, aryloxy, trialkylsilyl, triarylsilyl, trialkoxysilyl triaryloxysilyl, ester, thioester or nitrile group, and X is a halogen (e.g., Cl, Br, I) or other anion-forming substituent (e.g., $CH_3SO_3$, OTs, wherein Ts is tosylate), is combined with a compound having the general formula:

R'—Y wherein Y is nitrogen (N), phosphorus (P) or arsenic (As). R' can be a trialkyl or a triaryl group (e.g., $(CH_3)_3$, $(C_6H_5)_3$, etc). or part of a heterocyclic ring (e.g., R'-Y-pyridine) The resulting intermediate polymerizes spontaneously to form a highly conjugated acetylene having the general formula:

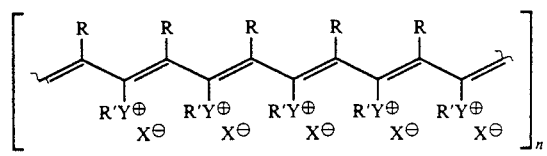

wherein n is an integer representing the number of repeating units in the polymer In another embodiment of the method, an acetylenic compound having the formula:

R—C≡C—X wherein R and X are as defined above, is reacted with a nitrogen, or phosphorus-containing compound capable of extensive charge delocalization upon quaternization, such as organic dyes, for example, phthalocyanine dye or methyl violet-B base.

In another embodiment of the present method, an acetylene monomer having a heteroatom susceptible to quaternization having the formula:

R—C≡C—N< wherein R is as described above, is combined with a second compound having the general formula:

R'—X wherein R' and X are as described above. The resulting intermediate polymerizes spontaneously to form a highly conjugated charged polyacetylene having the formula:

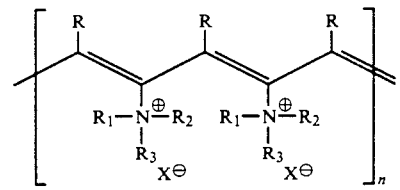

wherein $R_1$, $R_2$ and $R_3$ are used in place of R'. $R_1$, $R_2$ and $R_3$ are independently an alkyl group, aryl group or $R_1$ and $R_2$ together form a heterocyclic ring with N.

In another embodiment of the present method, an acetylenic monomer having the formula:

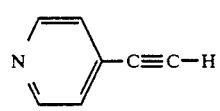

is reacted with a compound having the formula:

R—X wherein R and X are as described above The resulting intermediate polymerizes spontaneously to form a polyacetylene having the formula:

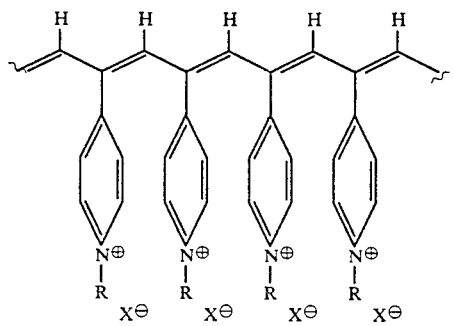

In another embodiment of the present method, a disubstituted acetylenic monomer, such as:

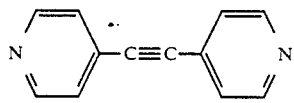

is combined with two equivalents of a compound having the formula:

R—X wherein R and X are as defined above. The resulting intermediate polymerizes spontaneously to form a disubstituted polyacetylene having the formula:

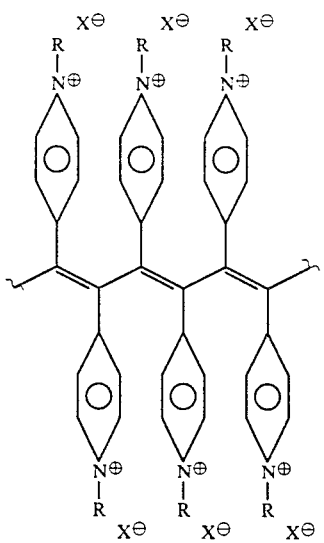

In another embodiment of the present method, the acetylene monomer is reacted with a metal salt. For example, an acetylenic monomer having the formula:

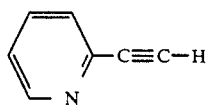

is combined with a metal salt having the formula:

$$M_a\text{—}X_b$$

wherein M is a metal selected from the group consisting of: Fe, Sn, Cu, Nb, W, Ta, Mo, Al, Ni, Pd, Si, Ge, Ti, V, Cr and Co. X is as described above and a and b are integers representing the number of atoms or groups in the formula. The resulting intermediate polymerizes spontaneously to form a polyacetylene having the formula:

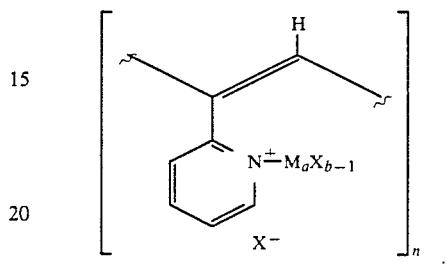

The present method provides polyacetylenes which have several unique features. For example, substituted extensively conjugated polyacetylenes (having 10 or more double bonds in conjugation) can be synthesized using the method. The method can be utilized to prepare ionic polyacetylenes that have charges located in the α-position to the polymer backbone. The present polyacetylenes are stable to oxygen, soluble in many common polymer organic solvents and water, and are easily processible.

The present polyacetylenes have many applications. For example, they can be used as permselective membranes and in energy storage devices. The conductivity of these polymers can be greatly increased by doping procedures and the resulting materials can be polymers utilized in applications requiring materials exhibiting semiconductivity and conductivity.

DETAILED DESCRIPTION OF THE INVENTION

The unique structure of the present highly conjugated, charged polyacetylenes relies on the spontaneous polymerization of acetylenic monomers possessing certain characteristics. Acetylenic monomers that are useful in synthesizing the present polymers are monomers in which the acetylenic triple bond is either directly attached to or in conjugation with a quaternized, charge-bearing heteroatom. These charge-bearing acetylenic monomers can be obtained by reacting an acetylenic compound that functions as a quaternizing agent with a second compound that has a quaternizable heteroatom, such as a nitrogen (N), phosphorus (P) or arsenic (As). Alternatively, an acetylenic compound that has a quaternizable heteroatom (N, P or As) either directly adjacent to or in conjugation with the triple bond is reacted with a second compound which is capable of quaternizing the heteroatom, i.e., a quaternizing agent Acetylenic monomers that are particularly useful for these reactions include those containing tertiary aromatic, cycloaliphatic or aliphatic amines, phosphines or arsines in which the quaternizable atom is either directly adjacent to or in conjugation to the acetylenic triple bond. Examples of such monomers include 4-ethynylpyridine, 2-ethynylpyridine 1,2-bis-4-pyridylacetylene 1,2-bis-2-pyridylacetylene and 1,3-bis-4- pyridylbutadiyne In addition to acetylenic monomers polyacetylenic compounds such as acetylenic dimers trimers or larger molecules containing multiple conjugated acetylenic triple bonds can be used These polyacetylenic molecules must possess the characteristics described for the acetylenic monomers, that is, they must be capable of forming a quaternized intermediate with the quaternized heteroatom being directly adjacent to or in conjugation with the acetylenic triple bonds.

The second compound is referred to herein as the "quaternizing agent". The quaternizing agent is a compound that contains a functional group that is capable of forming an anion in the quaternized intermediate. Example of these include alkyl halides (Cl, Br, I), alkylsulfonates ($CH_3SO_3$, OTs, wherein Ts is tosylate (p-tolenemethaneulfonate) or metal salts ($FeCl_3$, $SnCl_4$, $CuCl_2$). Bromododecane and ethyl iodide are specific examples of alkyl halides that are useful as quaternizing agents. The quaternizing agent can also be a halogenated or a sulfonated macromolecule, for example polyvinylchloride, polyvinylbromide or polyvinylsulfonate. In every case the resulting quaternized acetylenic monomer polymerizes spontaneously to form highly conjugated, charged polyacetylenes. The quaternizing agent can also be a macromolecule that contains amino groups such as, for example, poly(vinylpyridine) or polypyrrole, which would quaternize by reacting with an acetylenic monomer having the formula:

R—C≡C—X wherein R and X are as defined above. The resulting quaternized intermediate polymerizes spontaneously to form a highly conjugated charged polymer having the formula:

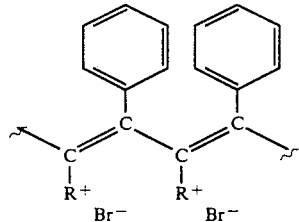

In one embodiment of the present invention, the present polymers can be made according to the following general procedure. An acetylenic compound having the general formula:

R—C≡C—X wherein R is H, an alkyl, alkoxy, aryl, aryloxy, trialkylsilyl, triarylsilys, trialkoxysilyl, triaryloxysilyl, ester, thioester or nitrile group (examples include alkyl groups having the general formula $C_mH_{2m+1}$, wherein $0 \leq m \leq 30$); and X is a halogen or a group capable of forming an anion. For example, X can be Cl. Br, I, $CH_3SO_3^-$ or $OTs^-$. The acetylenic compound is combined with a second compound having the general formula:

R'—Y wherein Y is trisubstituted heteroatom, such as nitrogen (N), phosphorous (P) or arsenic (As) and R' is a trialkyl group having the general mentioned above or a triaryl group Examples include $(CH_3)_3$, $(C_6H_5)_3$, etc Y can also be part of an aromatic ring structure for example R'—Y is pyridine. The resulting quaternized intermediate polymerizes spontaneously to form a highly conjugated charged polyacetylene having the general formula:

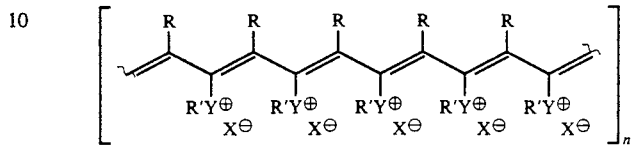

wherein n is an integer representing the number of repeating units in the polymer chain.

In another embodiment of the present method, an acetylenic compound having the formula:

ti R—C≡C—N< wherein R is as described above, is combined with a compound having the general formula:

R'—X wherein R' and X are as described above. The resulting intermediate polymerizes spontaneously to form a highly conjugated, charged polyacetylene having the formula:

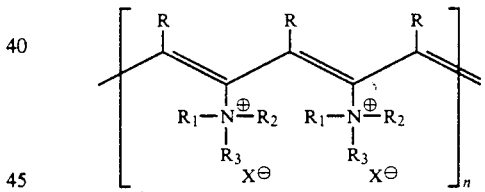

wherein $R_1$ $R_2$ and $R_3$ are used in place of R'. $R_1$, $R_2$ and $R_3$ are independently and alkyl group, an aryl group or $R_1$ and $R_2$ together form a heterocyclic ring with N.

In another embodiment of the present method, an acetylene compound having the formula:

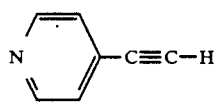

is reacted with a compound having the formula:

R—X wherein R and X are as described above. The resulting intermediate polymerizes spontaneously to form a polyacetylene having the formula:

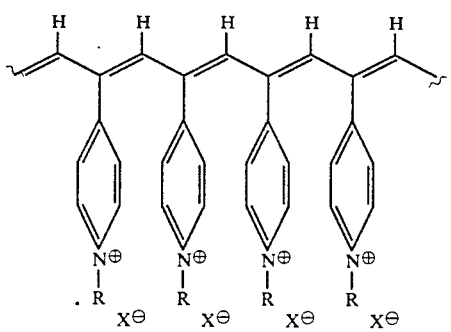

In another embodiment of the present method, one equivalent of a disubstituted acetylene compound, such as:

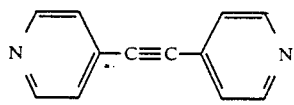

is combined with two equivalents of a compound having the formula:

R—X wherein R and X are as defined above. The resulting intermediate polymerizes spontaneously to form a disubstituted polyacetylene having the formula:

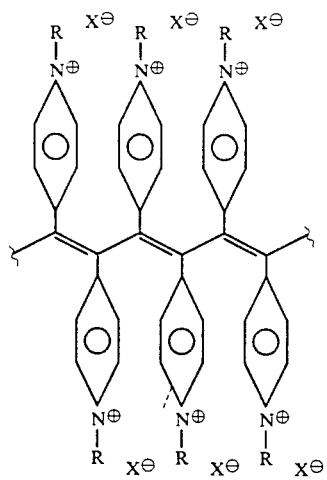

In another embodiment of the present method, a disubstituted diacetylenic compound having the structure:

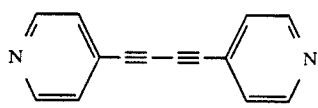

is reacted with two equivalents of a compound having the formula:

R—X wherein R and X are as defined previously. The resulting intermediate polymerizes spontaneously to form a disubstituted polyacetylene having the formula:

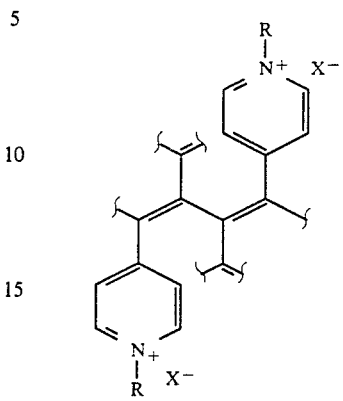

In another embodiment of the present method, the acetylenic monomer is reacted with a metal halide salt. For example, in this embodiment, an acetylenic monomer having the formula:

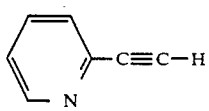

is combined with a metal halide salt having the formula:

$M_a$—$X_b$ wherein M is a metal, such as iron (Fe), tin (Sn), copper (Cu), niobium (Nb), tungsten (W), tantalum (Ta), molybdenum (Mo), aluminum (Al), nickel (Ni), palladium (Pd), silicon (Si), germanium (Ge), titanium (Ti), vanadium (V), chromium (Cr) and cobalt (Co), X is as described above, and wherein a and b are integers representing the number of each type of atom or group in the general formula. The resulting intermediate polymerizes spontaneously to form a polyacetylene having the formula:

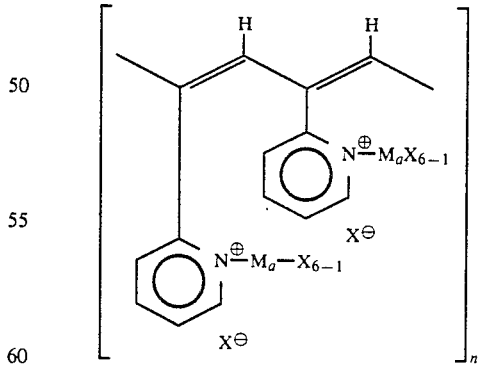

The present method is generally carried out as follows: the acetylene monomer is reacted with the quaternizing agent under conditions sufficient to cause the acetylene monomer to become quaternized. The reaction is carried out in an organic solvent. Solvents which are useful in the process are polar organic solvents such as methanol, ethanol, acetone, nitro methane, nitrobenzene, and acetonitrile. The reaction mixture containing the acetylenic monomer quaternizing agent and, optionally, the solvent, is warmed to a temperature which causes quaternization of the acetylene monomer to occur. A preferred temperature range is from about −20° C. to about 100° C. The reaction mixture is held at this temperature for a time sufficient for spontaneous polymerization of the quaternized acetylene monomers to be completed. The polymer generally precipitates from the reaction mixture as a dark-colored solid. The polymer can then be filtered, washed or otherwise treated as desired.

The present polyacetylenes have several unique characteristics They are extensively conjugated. (about 10 or more double bonds in conjugation) The present polyacetylenes have charges directly adjacent to or in conjugation with the polymer, the present polymers have high charge densities (about 1-2 charges per repeating unit). Unique, extensively conjugated disubstituted polyacetylenes can be produced using the present method The present polymers are soluble in common organic solvents (and in water for certain cases) and are easily processible.

The extent of substitution of the polyacetylenes depends upon the substituent groups present in the acetylenic monomer and the quaternizing agent A wide variety of substituents is tolerated, including those leading to crosslinked structures. The present polymers can be co-polymerized or crosslinked with other polymers used as matrices such as polyvinyl halides, polyheterocyclic amines or polyvinylpyridines to form unique copolymer networks with extensively conjugated chains.

The present polyacetylene polymers are useful in several applications For example, they can be cast as films and utilized as permselective membranes for gas separation Due to the unique location of the charge which is either directly adjacent to or in conjugation with the double bonds in the polymer backbone, the present polyacetylenes can be used as semiconductive or conductive materials. These Polyacetylenes can be doped with electron-donating dopants such as, for example, molecular iodine or bromine, TCNQ, TCNQ°/TCNQ−, AsF$_5$ or SbF$_5$ to afford electrically conducting materials. An example of the doping process is set out in detail in Example 7. The resulting doped polyacetylenes can be used as semiconductive materials.

The present invention will now be further illustrated by the following examples.

EXAMPLES

Materials and Methods

4 Ethynylpyridine and 1,4-bis-4-pyridylbutadiyne were synthesized by previously reported methods. L. D. Ciana et. al., *J. Heterocyclic Chem.*, 21:607 (1984). 1,2-bis-4,4'-dipyridylacetylene was prepared by the method outlined by Ludi et al. M. Tanner et al., *Chimia*, 34:23 (1980). 2-Ethynylpyridine was obtained from Farchan Laboratories. Acetonitrile (HPLC grade) was obtained from VWR Scientific and was distilled under nitrogen before use. 1-Bromododecane and ethyl iodide were obtained from Aldrich Chemical Company.

Infrared spectra were recorded using KBr disks on a Perkin Elmer 1600 Series FT IR spectrophotometer UV-visible spectra were recorded on an IBM 9420 spectrometer using absolute ethanol as solvent Viscosity measurements were made in absolute methanol using a Canon Ubbelohde dilution type viscometer.

EXAMPLE 1

Synthesis of Poly(4-N-dodecylpyridiniumbromide acetylene)

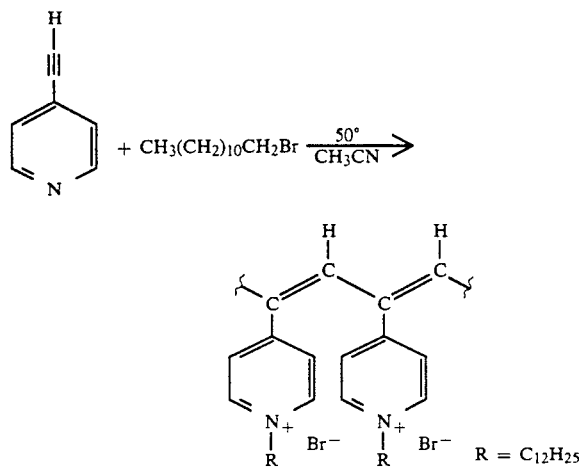

0.5 g (4.85×10$^{-3}$ mol) of 4-ethynylpyridine was dissolved in freshly distilled acetonitrile (30 ml) and 1.21 g (4.85×10$^{-3}$ mol) 1-bromododecane was added rapidly to the stirred solution. The reaction mixture was warmed to 50° C. and stirring was continued at this temperature for 72 hours. During this time the solution acquired a deep blue.black color and the polymeric product separated out as a black solid. It was filtered, reprecipitated from methanol with ethyl ether, and dried at 30° C. under vacuum. The yield was 1.21 g.

The product was a black powder and was readily soluble in ethanol, methanol and other polar organic solvents.

Elemental analysis showed that the product was a homopolymer of the quaternary ethynylpyridinium salt with 1-bromododecane (C=64.59%, H=8.17%, N=4.98%, Br=22.04%). The structure was confirmed by the infrared spectrum which showed characteristic absorption of bands of the pyridine ring (660, 754 cm$^{-1}$), and an intense band of the conjugated —C=C— bonds (1634 cm$^{-1}$). The bands corresponding to the —C≡C—H stretch (3128 cm$^{-1}$) and the —C≡C— stretch (2098 cm$^{-1}$) of the ethynyl group were absent in the product. The polymer also exhibited an absorption in the visible region of the UV spectrum ($\lambda_{max}$ =599 nm, $\epsilon_{max}$=8.2×10$^4$), which supports the conjugated structure.

The inherent viscosity measured in absolute methanol solution at 20° C. was 0.91 dl/g.

EXAMPLE 2

Synthesis of Poly(2-N-ethylpyridiniumiodideacetylene)

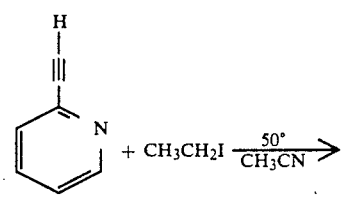

-continued

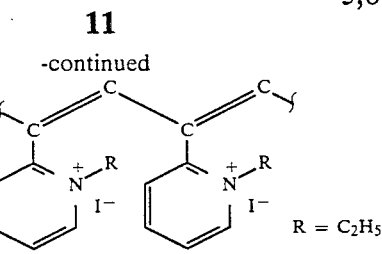

R = C₂H₅

0.5 g (4.85×10⁻³ mol) of 2-ethynylpyridine was dissolved in freshly distilled acetonitrile and 0.76g (4.85×10⁻³ mol) of ethyl iodide was added rapidly to the stirred solution. The reaction was run in an identical manner to that described in Example 1. The deep purple. black solid obtained after workup was dried at 30° C. under vacuum. The yield was 0.68 g. The product was readily soluble in ethanol, methanol and other polar organic solvents.

Elemental analysis showed the product to be a homopolymer of the quaternary ethynylpyridinium salt with ethyl iodide (C=51.68%, H=7.74%, I=35.99%).

The infrared spectrum of the polymer showed characteristic absorption bands of the pyridine ring (641, 746 cm⁻¹), and an intense band of the conjugated —C=C— bonds (1621 cm⁻¹). The bands corresponding to the —C≡C—H (3130 cm⁻¹) and —C≡C— (2098 cm⁻¹) of the ethynyl group were absent in the product. The polymer also exhibited an absorption in the visible region of the UV spectrum ($\lambda_{max}$=433 nm, $\epsilon_{max}$1.4×10⁵), which is indicative of extensive conjugation.

The inherent viscosity measured in absolute methanol solution at 20° C. was 0.90 dl/g.

EXAMPLE 3

Synthesis of Poly(1,2-bis-4-N-dodecylpyridiniumbromide acetylene)

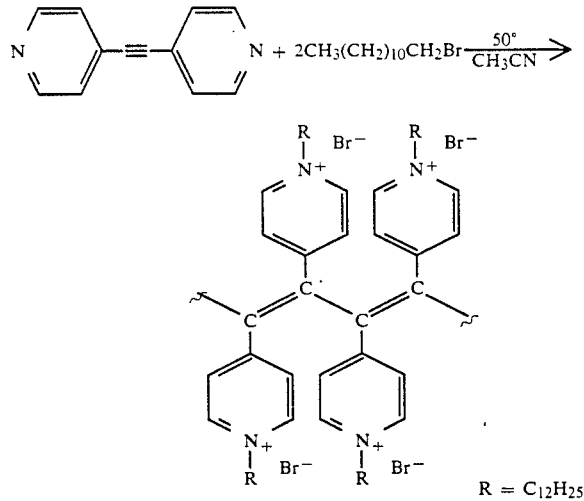

R = C₁₂H₂₅

0.05 g (2.8×10⁻³ mol) of 1,2-bis-4-pyridylacetylene was dissolved in freshly distilled acetonitrile (30 ml) and 0.69 g (5.6×10⁻³ mol) of 1-bromododecane was added rapidly to the stirred solution. The reaction was carried out in an identical manner that described in Example 1. The black solid obtained after workup was dried at 30° C. under vacuum. The yield of poly-(1,2-bis-4-N-dodecylpyridinium bromide) acetylene was 1.12 g. The product was readily soluble in ethanol, methanol and polar organic solvents.

Elemental analysis showed the product to be a homo polymer of the diquaternary salt of 1,2-bis-4-pyridiniumacetylene with dodecylbromide (C=64.62%, H=7.92%, N=6.34%. Br=18.84%).

The infrared spectrum of the polymer showed characteristic absorption bands of the pyridine ring (660, 755 cm⁻¹) and an intense band of the conjugated —C=C— bonds (1635 cm⁻¹). The band corresponding to the —C≡C— bond (1936 cm⁻¹) in the dipyridylacetylene was absent in the product. The polymer also exhibited an absorption in the visible range of the UV spectrum ($\lambda_{max}$=450 nm, $\epsilon_{max}$=2.2×10⁵), indicative of extensive conjugation.

The inherent viscosity measured in absolute methanol at 28° C. was 0.93 dl/g.

EXAMPLE 4

Synthesis of Polypyridiniumbromideacetylene

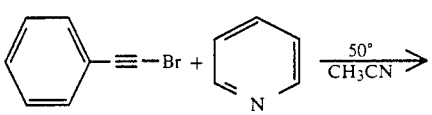

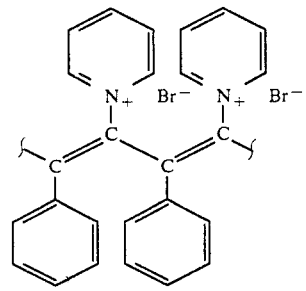

0.5 g. (2.8×10⁻³ mol) of α-bromophenylactylene was dissolved om freshly distilled acetonitrile (30 ml) and 0.22 g (2.8×10⁻³ mol) of dry pyridine was added rapidly to the stirred solution. The reaction was carried out in a manner identified to that described in Example 1. The dark brown solid obtained after workup was dried at 30° C. under vacuum. The yield of poly(-pyridiniumbromideacetylent) was 0.52 g. The polymer was soluble in ethanol, methanol and polar organic solvents.

Elemental analysis showed the product to be a homopolymer of the quaternary pyridinium salt of α-bromophenylacetylene (C=55.60%, H=3.54%, N=3.48%, Br=32.86%).

The infrared spectrum of the polymer showed characteristic absorption bands of the pyridine ring (689, 755 cm ⁻¹) and an intense band of the conjugated —C=C— bonds (1585 cm⁻¹). The polymer also exhibited an absorption in the visible region of the UV spectrum ($\lambda_{max}$=401 nm, $\epsilon_{max}$=1.69×10⁻³), indicative of conjugation.

EXAMPLE 5

Synthesis of Poly(1,3-bis-4-N-dodecylpyridiniumbromide acetylene)

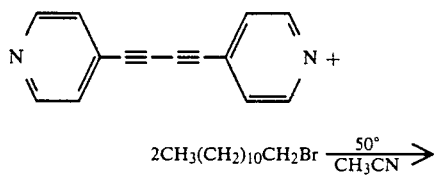

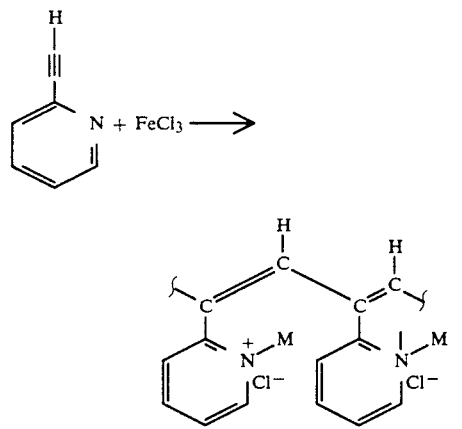

0.1 g ($4.9 \times 10^{-4}$ mol) of 1,3-bis-4-pyridylbutadiyne was dissolved in freshly distilled acetonitrile (30 ml) and 0.244 g ($9.8 \times 10^{-4}$ mol) pf 1-bromododecane was added rapidly to the stirred solution. The reaction was carried out in a manner identical to that described in Example 1. The product obtained as a black powder was dried at 30° C. under vacuum. The yield poly-(1,3-bis (4-N-dodecylpyridiniumbromide) acetylene was 0.22 g. The polymer was found to be highly insoluble, indicating extensive crosslinking.

EXAMPLE 6

Synthesis of Poly(2-N-iron(III)dichloridepyridiniumchlorideacetylene)

1.57 g ($9.7 \times 10^{-3}$ mol) of anhydrous ferric chloride was dissolved in dry methanol (25 ml). The solution was stirred under dry nitrogen and cooled to 0° C. 0.05 g ($4.85 \times 10^{-3}$ mol) of 2-ethynylpyridine dissolved in dry methanol (5 ml) was added rapidly to the stirred solution. The temperature of the reaction mixture was maintained at 0° C. for one hour after which it was allowed to warm to 25° C. Stirring was continued for 48 hours during which time the polymer precipitated as a black solid. The product was filtered, washed several times with methanol and dried at 30° C. under vacuum to yield a black powder. The yield was 0.68 g.

The polymer was highly soluble in water and had poor solubility in organic solvents.

The polymer exhibited an absorption in the visible region of the UV spectrum ($\lambda_{max} = 532$ nm, $E_{max} = 1.58 \times 10^5$), indicating extensive conjugation.

EXAMPLE 7

Doping of Poly(1,2-bisdodecylpyridiniumbromide acetylene)

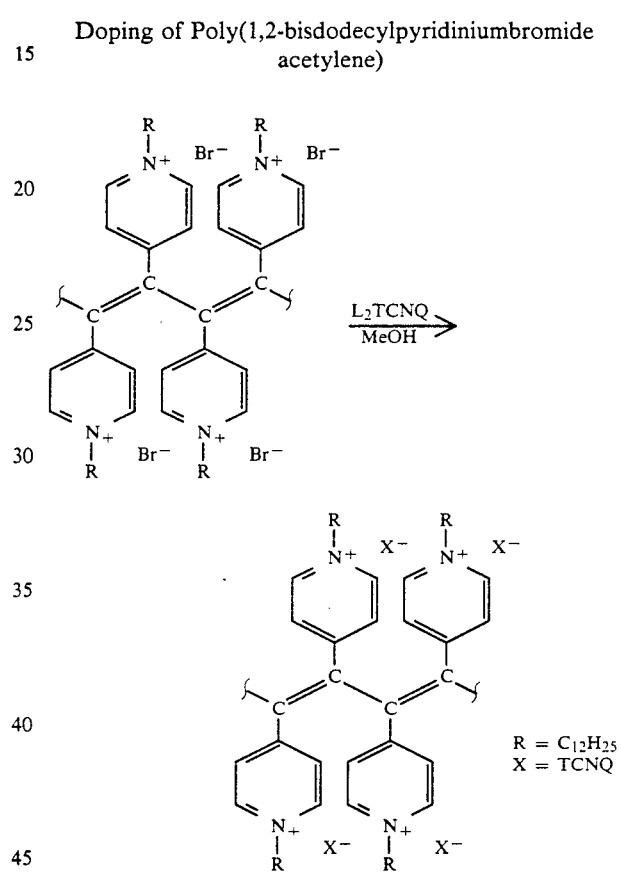

0.1 g of poly(1,2-bisdodecylpyridiniumbromideacetylene) was dissolved in dry methanol (25 ml) and 0.07 g ($3.26 \times 10^{-4}$ mol) of lithiumtetracyanoquinodimethane (LiTCNQ) dissolved in methanol (25 ml) was added rapidly to the stirred solution. The deep purple solution was warmed to 50° C. and stirred for 72 hours. The solvent was then evaporated to yield a lustrous blue-black solid. This was washed several times with water and dried in a vacuum. The yield was 0.6 g.

The infrared spectrum of the polymer showed two intense bands of the cyano groups in TCNQ (2181, 2134 cm$^{-1}$) in addition to the intense band of the conjugated —C=C— bands (1639 cm$^{-1}$). The polymer also exhibited an absorption in the visible region of the UV spectrum ($\lambda_{max} = 438$ nm) indicative of conjugation.

The stoichiometry of the dopant may be varied by using different mole ratios of LiTCNQ in the above reaction. Complex salts may be prepared by using LiTCNQ with neutral TCNQ in the doping process described above.

EXAMPLE 8

Synthesis of Poly(methylviolet-β-bromidephenylacetylene)

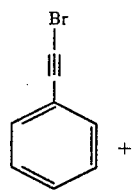

+

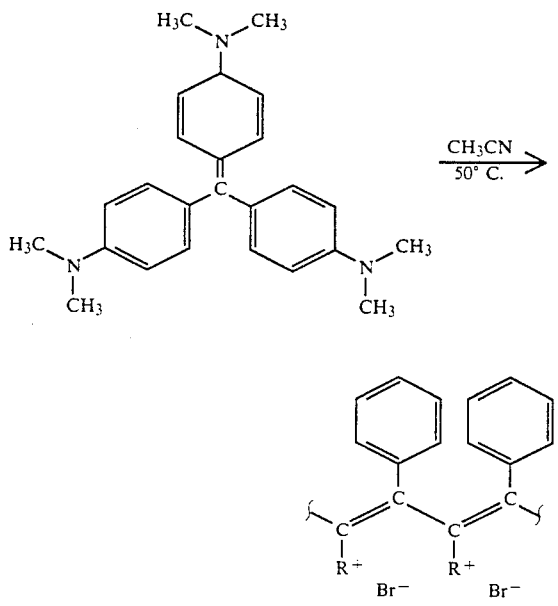

R = methyl violet-B 0.5 g (2.8×10⁻³ mmol) of α-bromophenylacetylene was dissolved in anhydrous acetonitrile (25 ml). 1.0 g (2.8×10⁻¹ mmol) of methyl violet-β base (Aldrich) dissolved in acetrnitrile (15 ml) was added rapidly to the stirred solution. The reaction mixture was warmed to 50° C. and the stirring was continued for 72 hours. The product precipitated as a dark solid. This was filtered, washed several times with acetonitrile and dried in vacuum at 30° C. The yield of the lustrous blue-black title compound was 1.2 g.

The polymer exhibited an absorbtion in the visible region of the UV spectrum ($\lambda_{max}$=584 nm), indicative of extensive conjugation.

Equivalents

Those skilled in the art will recognize, or be able to ascertain using no more than routine experimentation, equivalents to the specific embodiments of the invention described herein. Such equivalents are intended to be encompassed in the scope of the following claims.

I claim:

1. A polyacetylene having the formula

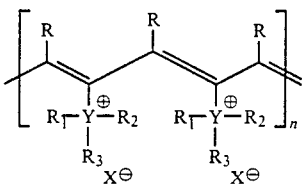

wherein R is selected from the group consisting of: H, alkyl, alkoxy, alkylthio, trialkylsilyl, trialkoxysilyl, ester and thioester groups; $R_1$, $R_2$ and $R_3$ are independently an alkyl group or an aryl group or $R_1$ and $R_2$, together with Y, form a heterocyclic or heterocyclic aromatic ring system; X is an anion or a group of atoms capable of forming an anion; and Y is a heteroatom selected from the group conssiting of: N, P and As.

2. A polyacetylene of claim 1 wherein R is a phenyl ring, R'Y is a pyridinium ion and X is Br⁻.

3. A polyacetylene having the formula:

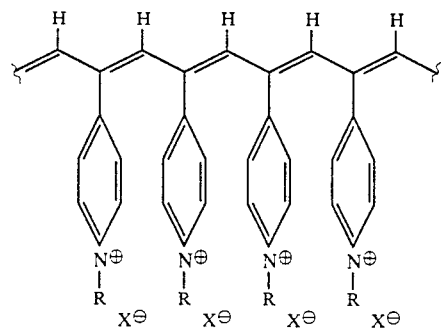

wherein R is selected from the group consisting of: H, alkyl, alkoxy, alkylthio, trialkylsilyl, trialkoxysilyl, aryl, aryloxy, arylthio, triarylsilyl, triaryloxysilyl, ester thioester and nitrile groups; X is an atom or a group of atoms capable of forming an anion.

4. A polyacetylene of claim 3 wherein R is ethyl or dodecyl and X⁻ is Br⁻ or I⁻.

5. A polyacetylene having the formula:

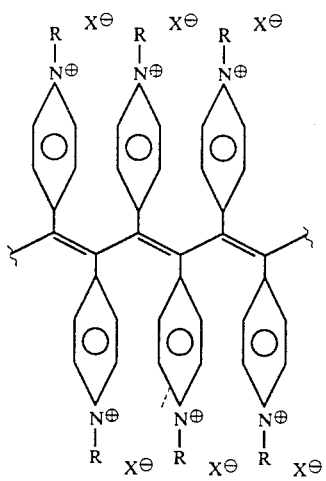

wherein R is selected from the group consisting of: H, alkyl, alkoxy, alkylthio, trialkylsilyl, trialkoxysilyl, aryl, aryloxy, arylthio, triarylsilyl, triaryloxysilyl, ester thioester and nitrile groups; X is an atom or a group of atoms capable of forming an anion.

6. A polyacetylene of claim 5 wherein R is ethyl o dodecyl and X is I⁻, Br⁻, CH₃SO₃⁻, OTs⁻ or Cl⁻.

* * * * *

UNITED STATES PATENT AND TRADEMARK OFFICE
CERTIFICATE OF CORRECTION

PATENT NO. : 5,037,916
DATED : August 6, 1991
INVENTOR(S) : Alexandre Blumstein and Sundar Subramanyam It is certified that error appears in the above-identified patent and that said Letters Patent is hereby corrected as shown below:

Claim 1, Column 16, line 12, after "independently" insert --- hydrogen, ---.

Claim 5, Column 16, line 63, insert a comma between the words "ester" and "thioester".

Claim 5, Column 16, line 64, after the word "an" delete "atom" and insert --- anion ---.

Claim 6, Column 16, line 67, after "ethyl" delete the "o" and insert --- or ---.

Signed and Sealed this

Fourth Day of May, 1993

Attest:

MICHAEL K. KIRK

*Attesting Officer*  Acting Commissioner of Patents and Trademarks

UNITED STATES PATENT AND TRADEMARK OFFICE
CERTIFICATE OF CORRECTION

PATENT NO. : 5,037,916

DATED : August 6, 1991

INVENTOR(S) : Alexandre Blumstein and Sundar Subramanyam

It is certified that error appears in the above-identified patent and that said Letters Patent is hereby corrected as shown below:

Claim 1, Column 16, line 11, after "trialkoxysilyl" insert
---aryl, aryloxy, arylthio, triarylsilyl, triaryloxysilyl,---.

Signed and Sealed this

Thirty-first Day of May, 1994

Attest:

BRUCE LEHMAN

Attesting Officer

Commissioner of Patents and Trademarks